(12) United States Patent
Akerblom et al.

(10) Patent No.: US 9,285,015 B2
(45) Date of Patent: Mar. 15, 2016

(54) CONTINUOUSLY VARIABLE TRANSMISSION AND A WORKING MACHINE INCLUDING A CONTINUOUSLY VARIABLE TRANSMISSION

(75) Inventors: Mats Akerblom, Eskilstuna (SE); Per Mattsson, Hindas (SE)

(73) Assignee: Volvo Construction Equipment AB, Eskilstuna (SE)

( * ) Notice: Subject to any disclaimer, the term of this patent is extended or adjusted under 35 U.S.C. 154(b) by 0 days.

(21) Appl. No.: 14/364,904

(22) PCT Filed: Dec. 23, 2011

(86) PCT No.: PCT/SE2011/000247
§ 371 (c)(1),
(2), (4) Date: Jun. 12, 2014

(87) PCT Pub. No.: WO2013/095213
PCT Pub. Date: Jun. 27, 2013

(65) Prior Publication Data
US 2014/0364268 A1    Dec. 11, 2014

(51) Int. Cl.
*F16H 48/06* (2006.01)
*F16H 3/62* (2006.01)
*F16H 47/04* (2006.01)
(Continued)

(52) U.S. Cl.
CPC .. *F16H 3/62* (2013.01); *F16H 3/76* (2013.01); *F16H 47/04* (2013.01); *E02F 9/2253* (2013.01); *F16H 2037/0886* (2013.01); *F16H 2037/101* (2013.01); *F16H 2037/103* (2013.01); *F16H 2200/201* (2013.01); *F16H 2200/2012* (2013.01); *F16H 2200/2023* (2013.01); *F16H 2200/2046* (2013.01)

(58) Field of Classification Search
CPC ............ F16H 3/62; F16H 3/76; F16H 47/04; F16H 2200/2012; F16H 2200/2046; F16H 2037/103; F16H 2037/101; F16H 2200/201; F16H 2200/2023; F16H 2037/0886
See application file for complete search history.

(56) References Cited

U.S. PATENT DOCUMENTS 4,355,547 A  *  10/1982  Poole et al. ................... 475/217
5,980,410 A      11/1999  Stemler et al.
(Continued)

FOREIGN PATENT DOCUMENTS

DE          4323358  C1   5/1994
DE     102010003941  A1  10/2011
(Continued)

OTHER PUBLICATIONS

International Search Report (Sep. 19, 2012) for corresponding International Application PCT/SE2011/000247.

*Primary Examiner* — David J Hlavka
(74) *Attorney, Agent, or Firm* — WRB-IP LLP

(57) ABSTRACT

A continuously variable transmission includes a variator unit having a variator input shaft and a variator output shaft, and a first, a second, a third and a fourth planetary gear set, wherein each of the first and second planetary gear sets has a first member operatively connected to a common transmission input shaft, which transmission input shaft is common to the first and second gear sets, and a second member operatively connected to an output shaft, which output shaft is common to the first and second gear sets. Each of the first and second planetary gear sets further includes a third member, and the third planetary gear set has a first, a second and a third member.

20 Claims, 11 Drawing Sheets

(51) Int. Cl.
*F16H 3/76* (2006.01)
*E02F 9/22* (2006.01)
*F16H 37/08* (2006.01)
*F16H 37/10* (2006.01)

(56) References Cited

U.S. PATENT DOCUMENTS

| | | | | |
|---|---|---|---|---|
| 6,059,685 | A * | 5/2000 | Hoge et al. | 475/214 |
| 6,099,431 | A * | 8/2000 | Hoge et al. | 475/216 |
| 6,719,659 | B2 * | 4/2004 | Geiberger et al. | 475/216 |
| 6,726,590 | B2 * | 4/2004 | Henzler et al. | 475/216 |
| 7,588,509 | B1 | 9/2009 | Marsha | |
| 8,066,609 | B2 | 11/2011 | Kersting | |
| 2004/0204284 | A1 * | 10/2004 | Inoue et al. | 476/46 |
| 2005/0037887 | A1 * | 2/2005 | Shinojima et al. | 475/214 |
| 2005/0049109 | A1 * | 3/2005 | Imanishi et al. | 477/39 |
| 2005/0075209 | A1 * | 4/2005 | Wafzig et al. | 475/216 |
| 2012/0040794 | A1 * | 2/2012 | Schoolcraft | 475/207 |
| 2012/0122624 | A1 * | 5/2012 | Hawkins et al. | 475/219 |
| 2014/0274540 | A1 * | 9/2014 | Schoolcraft | 475/219 |

FOREIGN PATENT DOCUMENTS

| | | |
|---|---|---|
| EP | 0818643 A2 | 1/1998 |
| GB | 2407853 A | 5/2005 |
| WO | 2011129554 A2 | 10/2011 |
| WO | 2012008884 A1 | 1/2012 |

* cited by examiner

CONTINUOUSLY VARIABLE TRANSMISSION AND A WORKING MACHINE INCLUDING A CONTINUOUSLY VARIABLE TRANSMISSION

The invention relates to a continuously variable transmission and a working machine comprising such a continuously variable transmission.

The invention is applicable on working machines within the fields of industrial construction machines, in particular dump trucks, wheel loaders and articulated haulers. Although the invention will be described hereinafter with respect to an articulated hauler and a wheel loader, the invention is not restricted to these particular machines but may also be used in other heavy working machines, such as graders, excavators or other construction equipment.

A continuously variable transmission is a transmission which speed ratio can be continuously varied over a designed range. Continuously variable transmissions are useful due to enabling operation of a prime mover at optimum speed or at optimum fuel economy while still providing a desired rotational speed at the output shaft of the transmission. In a continuously variable transmission a speed ratio between the output shaft speed to the input shaft speed of zero may be obtainable. Such a continuously variable transmission is usually referred to as an infinitely variable transmission. The existence of an output to input speed ratio of zero enables a geared neutral function where the input shaft is rotating when the output shaft stands still. The presence of a geared neutral position is useful in many industrial contexts, such as within gearboxes of working machines for example, since it may obviate the need of a starting clutch or a torque converter. Furthermore, infinitely variable transmissions facilitate separation of operation of a hydraulic system included for performing lifting operations and/or steering the working machine from the propulsion of the working machine, since the hydraulic system can be powered from a power take off at an input shaft, which may be kept running, while an output shaft connected to propulsion drive train can be kept at stand still. A typical arrangement of a continuously variable transmission includes a continuously variable unit, variator unit, having a variator input shaft and a variator output shaft connected to a planetary gear system.

An example of a continuously variable transmission is disclosed in U.S. Pat. No. 5,980,410.

U.S. Pat. No. 5,980,430, and in particular the embodiment disclosed in FIG. 2 of that document constitutes the closest prior art and relates to a continuously variable transmission.

The continuously variable transmission as disclosed in FIG. 2 of U.S. Pat. No. 5,980,410 includes a variator unit having a variator input shaft and a variator output shaft, and first, second and third planetary gear sets. The first and second planetary gear sets are arranged together and including each a first member being operatively connected to a common transmission input shaft and a second member being operatively connected to a common output shaft. Each of said first and second planetary gear sets further including a third member. A third planetary gear set having a first, second and third member is also included. The variator input shaft is operatively connected to the common output shaft and the variator output shaft is operatively connected to the third member of the first planetary gear set and selectively connectable to a transmission output shaft. The first member of said third planetary gear set is operatively connected to the third member of the first planetary gear set, and the second member of the third planetary gear set is operatively connected to the common output shaft. The third member of the third planetary gear set is selectively connectable to the transmission output shaft. Finally the third member of the second planetary gear set is selectively connectable to the transmission output shaft.

The continuously variable transmission disclosed in U.S. Pat. No. 5,980,410 enables selection between a set of operating modes having different bands of input to output speed ratios.

A problem with U.S. Pat. No. 5,980,410 is that the configuration of the continuously variable transmission will require presence of gear stages with a substantial gear ratio in order to enable the bands of input to output speed ratios to not substantially overlap. In order to provide for appropriate gear ratio of the steps additional sets of gear wheels may be needed, which makes the transmission more bulky, complex and expensive.

It is desirable to provide a continuously variable transmission which enables operation in at least five operating modes having different bands of input to output speed ratios and which transmission having a design facilitating separation of the bands of input to output speed ratios by limiting the need of additional sets of gear wheels in the transmission design.

The continuously variable transmission according to the invention includes a variator unit having a variator input shaft and a variator output shaft, and first, second, third and fourth planetary gear sets. Each of the first and second planetary gear sets has a first member being operatively connected to a transmission input shaft which transmission input shaft is common to the first and second gear sets, hereinafter referred to as a common transmission, input shaft. The common transmission input shaft is thus engaging with, forms part of or otherwise being connected to the first members of both the first and second planetary gear sets. Further, each of the first and second planetary gear sets has a second member being operatively connected to an output shaft which output shaft is common to the first and second gear sets. Here and below the output shaft common to the first and second gear sets is referred to as a common output shaft. The common output shaft is selectively connectable to a first member of the fourth planetary gear set.

Each of said first and second planetary gear sets further including a third member.

The variator input shaft is operatively connected to the third member of said second planetary gear set and the variator output shaft is operatively connected to the third member of said first planetary gear set. The variator is thus connected in parallel to the first and second planetary gears sets.

The inclusion of the first and second planetary gear sets enables the power transmitted to be split between the variator unit and the planetary gear sets. By such a gearbox having a powersplit, in many operation modes only a minor part of the power has to be transmitted by the variator unit. The remaining power is transmitted by the planetary gear wheel unit. This implies an improved overall efficiency since the loss of energy is considerably smaller with respect to the planetary gear wheel unit compared to the variator unit. Furthermore, the size of the variator unit can be reduced.

The continuously variable transmission further includes a third planetary gear set including a first, a second and a third member.

The first member of said third planetary gear set is operatively connected to the variator output shaft.

The second member of the third planetary gear set is selectively connectable to the third member of the second planetary gear set and selectively connectable to a transmission housing.

The third member of said third planetary gear set is selectively connectable to a transmission output shaft and selectively connectable to the first member of the fourth planetary gear set.

The fourth planetary gear set includes a second member being selectively connectable to the transmission housing and a third member being operatively connected to the transmission output shaft.

The layout of the continuously variable transmission according to the invention enables operation in six different modes.

For the selection of modes a mode selection arrangement is provided. The mode selection arrangement enables selection of different operating modes with different bands of continuously variable speed ratios between said common transmission input shaft and the transmission output shaft.

For the selection of the different operating modes the mode selection arrangement includes:
   a first clutch arranged in between said common output shaft and said first member of the fourth planetary gear set;
   a second clutch arranged in between said first member of the fourth planetary gear set and said third member of the third planetary gear set;
   a third clutch arranged in between said third member of the third planetary gear set and said transmission output shaft;
   a fourth clutch arranged in between said second member of said third planetary gear set and said third member of said second planetary gear set;
   a first kicking mechanism arranged to selectively lock said second member of said fourth planetary gear set to a transmission housing and release said second member of said fourth planetary gear set from said transmission housing;
   a second locking mechanism arranged to selectively lock said second member of said third planetary gear set to a transmission housing and release said second member of said third planetary gear set from said transmission housing; and
   a set of actuators arranged to control engagement and disengagement of said clutches and arranged to control locking of said locking mechanisms to said transmission housing and release of said locking mechanisms from said transmission housing, respectively.

The mode selection arrangement further includes a controller arranged for operating said set of actuators.

The controller enables selective operation of the continuously variable transmission in:
   a first operating mode where said first and second locking mechanisms are locked, said second clutch is engaged and said first, third and fourth clutches are disengaged;
   a second operating mode where said first locking mechanism is locked, said second locking mechanism is released, said second and fourth clutches are engaged and said first and third clutches are disengaged;
   a third operating mode where said first locking mechanism is locked, said second locking mechanism is released and said first clutch is engaged;
   a fourth operating mode where said second locking mechanism is released and said third and fourth clutches are engaged;
   a fifth operating mode where said first and second locking mechanisms are released, said first, second and third clutches are engaged and said fourth clutch is disengaged.

The clutches and the locking mechanisms can be designed in two ways, here referred, to as dog clutch or friction clutch. The dog clutch requires a differential speed over the clutch to be zero or close to zero when the clutch is to be engaged. The friction clutch can allow a considerably larger differential speed over the clutch when it is to be engaged.

Even when the transmission is designed to perform synchronous mode shifts with dog clutches, it may be preferable to use friction clutches in order to perform the mode shifts faster and with less control effort.

However, clutches and locking mechanisms which by a chosen mode shift strategy are not taking an active part in the mode shifts may still be designed as dog clutches to reduce cost and weight.

Change of operating modes may be performed according to different schemes in dependence of whether only friction clutches are used or if a mix of dog clutches and friction clutches are used.

In one embodiment of the invention the first locking mechanism and the second and third clutches are dog clutches, while the second locking mechanism and the first and fourth clutches are friction clutches.

In this event optionally,
   in said third operating mode the fourth clutch is disengaged and
   the controller is arranged to disengage or leave disengaged said third clutch and engage said second clutch for preparing a change from said third operating mode to said second operating mode; and
      in said third operating mode said fourth clutch is disengaged and said controller is arranged to disengage or leave disengaged said second clutch and engage said third clutch for preparing a change from said third operating mode to said fourth operating mode.

Optionally,
   in said fourth operating mode the first clutch is disengaged and the controller is arranged to disengage or leave disengaged said second clutch and lock said first locking mechanism for preparing a change from said fourth operating mode to said third operating mode; and
   in said fourth operating mode said first clutch is disengaged and said controller is arranged to release or leave released said first locking mechanism and engage said second clutch for preparing a change from said fourth operating mode to said fifth operating mode.

Optionally the controller enables selective operation of the continuously variable transmission in:
   a sixth operating mode where said first locking mechanism is released, said second locking mechanism is locked, said third clutch is engaged and said first and fourth clutches are disengaged.

Optionally the controller is arranged to:
   in said sixth operating mode selectively engage said second clutch for preparing a change from said sixth operating mode to said fourth operating mode.

In another embodiment all locking mechanisms and clutches are friction clutches.

Optionally, in this event the second clutch may be disengaged and the controller may be arranged to:
   in the sixth operating mode selectively engage the first clutch for preparing a change from the sixth operating mode to the fourth operating mode.

Optionally,
   in the third operating mode the second and third clutches are disengaged and the controller is arranged to engage or keep engaged the fourth clutch for preparing a change from the third operating mode to the second or fourth operating modes.

Optionally, in the fourth operating mode the second clutch is disengaged and the first locking mechanism is released and the controller is arranged to engage or keep engaged the first clutch for preparing a change from the fourth operating mode to the third or fifth operating modes.

In the event the second member of the third planetary gear set is connected to the transmission housing, the continuously variable transmission will be worked in an operating mode where the third planetary gear set will work as a reduction gear set enabling a large transmission ratio over the third planetary gear set. In the first operating mode the third member of the third planetary gear set is connected to the first member of the fourth planetary gear set while the second member of the fourth planetary gear set is connected to the transmission housing. The fourth planetary gear set here acts as another reduction gear set.

In a sixth operating mode the third member of the third planetary gear set is directly coupled to the transmission output shaft bypassing the fourth planetary gear set which is inactive.

In the event the second member of the third planetary gear set is connected to the third member of the second planetary gear set, the continuously variable transmission will be worked in an operating mode where the first, second and third planetary gear sets will work as a bridge, where the input shaft and output shaft of the variator are neither connected to the common transmission input shaft nor the transmission output shaft.

In the second operating mode the third member of the third planetary gear set is connected to the first member of the fourth planetary gear set while the second member of the fourth planetary gear set is connected to the transmission housing. The fourth planetary gear set here acts as a reduction gear stage.

In the event the common output shaft is connected to the first member of the fourth planetary gear set the continuously variable transmission will be worked in an operating mode where power will be transmitted to the transmission output shaft from the second members of the first and second planetary gear sets. Likewise as in the second operating mode, the first and second planetary gear sets of the continuously variable transmission will in the third operating mode work as a bridge having an input shaft, an output shaft and a variator connected to two additional shafts.

In the third operating mode the second member of the fourth planetary gear set is connected to the transmission housing. The fourth planetary gear set here acts as a reduction gear stage. In a fourth operating mode the third member of the third planetary gear set is directly coupled to the transmission output shaft bypassing the fourth planetary gear set, which is inactive.

In a fifth operating mode the common output shaft is directly coupled to the transmission output shaft bypassing the fourth planetary gear set, which is inactive.

By the continuously variable transmission design according to the invention, the third planetary gear set will work according to three different principles when the continuously variable transmission assumes the first, second and third operating modes. In the first mode the third planetary gear set works as a reduction gear, in the second mode the third planetary gear set merges power supplied to the first and second members of the third planetary gear set and in the third mode the third planetary gear set is a passive unit. The fourth operating mode works in the same principle as the second operating mode, the fifth operating mode works in the same principle as the third operating mode and the sixth operating mode works in the same principle as the first operating mode.

The use of the third planetary gear set as a reduction gear set will enable a large gear ratio over the third planetary gear set. This facilitates separation of the bands of input to output speed ratios of the different operating modes.

Optionally, the first, second and third members of the first planetary gear set are in the mentioned order constituted by a ring gear, a planet carrier and a sun gear, and that the first, second and third members of the second planetary gear set are in the mentioned order constituted by a planet carrier, a ring gear and a sun gear.

Here and below, a planet carrier common to the first and second planetary gears is referred to as a common planet carrier and a ring gear common to the first and second planetary gears is referred to as a common ring gear. Optionally the first members of said first and second planetary gear sets are constituted by a common planet carrier and said second members of said first and second planetary gear sets are constituted by a common ring gear and said third members of said first and second planetary gear sets are constituted by a first and a second sun gear.

Optionally, the first members of said first and second planetary gear sets are constituted by a common ring gear and said second members of said first and second planetary gear sets are constituted by a common planet carrier and said third members of said first and second planetary gear sets are constituted by a first and a second sun gear.

Optionally the first, second and third members of said third planetary gear set are in the mentioned order constituted by a sun gear, a ring gear and a planet carrier.

Optionally the first, second and third members of said fourth planetary gear set are in the mentioned order constituted by a sun gear, a ring gear and a planet carrier.

As stated, the second and third clutches and said first locking mechanism may be dog clutches, and said first and fourth clutches and said second locking mechanism may be friction clutches.

Optionally, the controller is arranged to selectively engage or disengage a dog clutch in an unloaded state before changing operating mode by engaging a friction clutch and disengaging another friction clutch.

Optionally, the first, second and third planetary gear sets are arranged in line along a common axis.

A mode selection arrangement may be provided which enables different operating modes with different bands of continuously variable speed ratios between said common transmission input shaft and said transmission output shaft.

A total speed ratio itotal may be defined as the rotational speed of the transmission output shaft ($\omega$transmission, output to the rotational speed of the transmission input shaft ($\omega$transmission, input, that is:

I itotal . . . ($\omega$transmission, output/$\omega$transmission, input—A variator speed ratio may be defined as the rotational speed of the variator output shaft (jJvariator, output to the rotational speed of the variator input shaft $\omega$variator, input, that is:

ivariator=($\omega$variator, output/($\omega$variator, input–

Preferably, a first band of the first operating mode extends front a total speed ratio itotal over the continuously variable transmission, which is equal to zero for a variator speed ratio of zero, to a ratio itotal=k for an absolute variator speed, ratio of infinity. A secondhand of a second operating mode preferably extends from ratio itotal=k for an absolute variator speed ratio of infinity, to a ratio itotal=m for a variator speed ratio of zero. A third band of a third operating mode preferably extends from ratio itotal=m for a variator speed ratio of zero to a ratio itotal=n for an absolute variator speed ratio of infinity. In order to enable the third band to meet the second band at a variator speed ratio of zero, a gear stage may be arranged in between the common output shaft and the first member of the fourth planetary gear set. A fourth band of a fourth operating mode preferably extends from ratio itotal=n for an absolute variator speed ratio of infinity, to a ratio itotal=o for a variator speed ratio of zero. A fifth band of a fifth operating mode preferably extends from ratio itotal=o for a variator speed ratio of zero to a ratio itotal=P for an absolute variator speed ratio of infinity. The absolute variator speed ratio may be negative or zero for all operating, modes or be positive or zero for all operating modes.

Mode changes are preferably performed when the rotational speeds at input and output of the clutch next in turn to be engaged are synchronous.

Optionally the variator unit is of hydraulic type. In this case the variator unit includes a first hydraulic machine provided with the input shaft of the variator unit and a second hydraulic machine provided with the output shaft of the variator unit, the first and second hydraulic machines being hydraulically connected to each other.

The configuration of the continuously variable transmission allows the variator unit to be controlled by a dual yoke enabling simultaneous control of displacements of the first and second hydraulic machines via a single actuator. The continuously variable transmission is enabling at least five different operating modes having a ratio ivanator=$\omega$variator, output/($\omega$variator, input with the same sign for each operating mode thereby enabling common control for the first and second hydraulic machines via a single actuator.

Optionally the variator unit is of an electric type. In this case the variator unit includes a first electric machine provided with said input shaft of the variator unit and a second electric machine provided with the output shaft of the variator unit, the first and second electric machines being electrically connected to each other.

The invention may be particularly useful in connection with a working machine, such as an articulated hauler, a wheel loader or a dump truck.

A working machine may be provided with a bucket, container or other type of implement for digging, lifting, carrying and/or transporting a load. A working machine may be operated with large and heavy loads in areas where there are no roads, for example for transports in connection with road or tunnel building, sand pits, mines and similar environments.

A working machine, such as a wheel loader is usually provided with a prime mover, such, as an internal combustion engine, a transmission line with a torque converter and a gearbox for supplying power to the driving wheels of the wheel loader. In addition to supply power to the driving wheels, the internal combustion engine has to supply power to one or more hydraulic pumps of a hydraulic system of the wheel loader. Such a hydraulic system is used for lifting operations and/or steering the working machine.

Hydraulic working cylinders may be arranged for lifting and lowering a lifting arm unit, on which a bucket, forks or other type of attachment or working tool is mounted. By use of another hydraulic working cylinder, the bucket can also be tilted or pivoted. Further hydraulic cylinders known as steering cylinders are arranged to turn the wheel loader by means of relative movement of a front body part and a rear body part of the wheel loader which body parts are pivotally connected relative to each other.

The gearbox is a continuously variable transmission as described above which gives a lot of advantages compared to a stepped gearbox. For example, the velocity of the working machine can be controlled independently of the speed of rotation of the prime mover. If the continuously variable transmission has a speed of rotation range comprising a mode where the rotation speed of the output shaft of the gearbox is zero or close to zero independently of the rotation speed of the input shaft of the gearbox at the same time as torque can be transmitted from the input shaft to the output shaft (usually referred to as an infinitely variable transmission (IVT) with geared neutral), the torque converter traditionally used in working machines can be omitted. By the expression "zero or close to zero" is meant a speed of rotation of the output shaft which is zero or in the size of a few rotations per minute.

By the continuously variable transmission and the geared neutral function the operation of the hydraulic system can be separated from the propulsion of the working machine for all vehicle speeds. Furthermore, the hydraulic system can be driven by the prime mover when the working machine stands still without using any clutch for disengagement of the prime mover relative to the transmission line.

BRIEF DESCRIPTION OF DRAWINGS

With reference to the appended drawings, below follows a more detailed description of embodiments of the invention cited as examples.

In the drawings:

FIG. 1A shows a first mode change scheme.

FIG. 1B shows a second mode change scheme.

DETAILED DESCRIPTION

Figure 1:
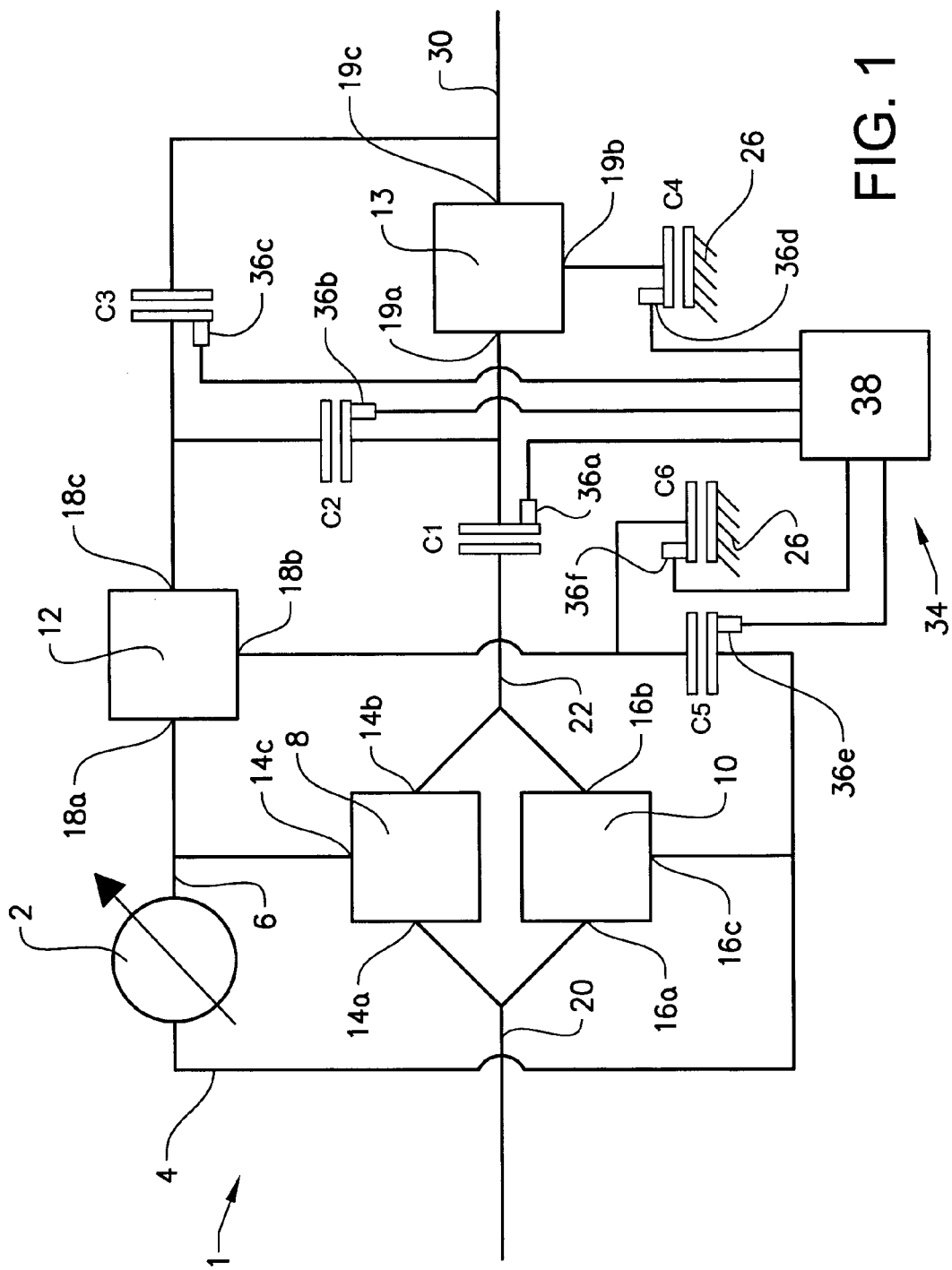
FIG. 1 shows a schematic illustration of the design of a continuously variable transmission according to the invention.

In FIG. 1 a schematic illustration of the design of a continuously variable transmission 1 according to the invention is shown. The continuously variable transmission 1 includes a variator unit 2 having a variator input, shaft 4 and a variator output shaft 6. The variator unit may be of a hydraulic type including a first hydraulic machine provided with the input shaft of the variator unit and a second hydraulic machine provided with the output shaft of the variator unit, the first and second hydraulic machines being hydraulically connected to each other, or of an electric type including a first electric machine provided with said input shaft of the variator unit and a second electric machine provided with the output shaft of the variator unit, the first and second electric machines being electrically connected to each other. Preferably the variator is of the hydraulic type. In one embodiment the variator unit may be a hydrostatic transmission having two bent axis—or swash plate type axial piston units which are alternatively operated as a pump and as a motor, with the two axial piston units being adjustable together with a pivotable dual yoke or by a pivotable dual swashplate. Such variator units are well known to persons skilled in the art and are described in detail in DE1064311 or US2009/0020004 for example.

The continuously variable transmission further includes first, second, third and fourth planetary gear sets 8, 10, 12, 13 respectively. The first planetary gear set 8 includes a first, a second and a third member 14a, 14b, 14c. The first, second and third members 14a, 14b, 14c of the first planetary gear set 8 are constituted by a son gear, a planet carrier and a ring gear, but not necessarily in the mentioned order. The second planetary gear set 10 includes a first, a second and a third member 16a, 16b, 16c. The first, second and third members 16a, 16b, 16c of the second planetary gear set 0 are constituted by a sun gear, a planet carrier and a ring gear, but not necessarily in the mentioned order. The third planetary gear set 12 includes a first, a second and a third member 18a, 18b, 18c. The first, second and third members 18a, 18b, 18c of the third planetary gear set 12 are constituted by a sun gear, a planet carrier and a ring gear, but not necessarily in the mentioned order. The fourth planetary gear set 13 includes a first, a second and a third member 19a, 19b, 19c. The first, second and third members 19a, 19b, 19c of the fourth planetary gear set 3 are constituted by a sun gear, a planet carrier and a ring gear, but not necessarily in the mentioned order.

The first and second planetary gear sets 8, 10 are arranged together. This means that the planetary gear sets have a common transmission input shaft 20 operatively connected to a respective first member of each of the first and second planetary gear sets 14a, 16a and a common output shaft 22 operatively connected to a respective second member of each of the first and second planetary gear sets 14b, 16b. The common output shaft 22 is selectively connectable to the first member 19a of the fourth, planetary gear set 13. The connection or disconnection between the common output shaft 22 and the first member 19a of the fourth planetary gear set is accomplished by a first clutch C1. The first clutch C1 is preferably a friction clutch.

Here, a branch connecting the common output shall 22 and the first member 19a of the fourth planetary gear set 13 may in addition to the first clutch C1 include gear stages for enabling a third band of transmission speed ratios to meet a second band of transmission speed ratios at a variator speed ratio of zero, as described earlier.

The operative connection between the common transmission input shaft 20 and the first members 14a, 16a of the first and second planetary gear sets 8, 10 and the operative connection between the common output shaft 22 and the second members 14b, 16b of the first and second planetary gear sets 8, 10 may be constituted by a direct connection where the common transmission input shaft 20 is directly connected, possibly as an integral part, without any intermediate gear stages to the first members 14a, 16a, and the second members 14b, 16b are directly connected, possibly as an integral part, without any intermediate gear stages, to the common output shaft 22.

In the continuously variable transmission according to the embodiment of the invention illustrated in FIG. 1, the variator input shaft 4 is operatively connected to the third member 16c of the second planetary gear set 10. By operatively connected, it is here intended that the connection may be made via a set of gear stages. The gear stages for connection between the variator input shaft 4 and the third member 16c of the second planetary gear set 10 may be included for allowing a connection between the third member of the second planetary gear set 10 and variator input shaft 4 to be made without making a gearbox topology substantially more complex. The connection may alternatively be direct.

The variator output shaft 6 is operatively connected to the third member 14c of the first planetary gear set 8. By operatively connected it is here intended that the connection is direct or may be made via a set of gear stages. The gear stages for connection between the variator output shaft 6 and the third member 14c of the first planetary gear set 8 may be included for allowing a connection between the third member of the first planetary gear set 8 and variator output shaft 6 to be made without making a gearbox topology substantially more complex.

The first member 18a of said third planetary gear set 12 is operatively connected to the variator output shaft 6. By operatively connected it is here intended that the connection is direct or may be made via a set of gear stages. The gear stages for connection between the variator output shaft 6 and the first member 18a of the third planetary gear set 12 may be included for allowing a connection between the variator output shaft 6 and third member of the first planetary gear set 8 and the first member 18a of the third planetary gear set 12 to be made without making a gearbox topology substantially more complex.

The second member 18b of the third planetary gear set 12 is selectively connectable to the third member 16c of the second planetary gear set 10. By selectively connectable is here intended that the connection between the second member 18b of the third planetary gear set 12 and the third member 16c of the second planetary gear set 10 may be engaged or disengaged. Therefore a fourth clutch C5 may be arranged in between the second member 18b of said third planetary gear set 12 and the third member 16c of the second planetary gear set 10. The fourth clutch C5 may be of any type suitable for making the connection. Preferably the fourth clutch C5 is a friction clutch. Also here, a branch connecting the second member 18b of the third planetary gear set 12 and the third member 16c of the second planetary gear set 10 may in addition to the fourth clutch C5 include gear stages for enabling connection between the second member 18b of said third planetary gear set 12 and the third member 16c of said second planetary gear set 10 to be made without making a gearbox topology substantially more complex.

The second member 18b of the third planetary gear set 12 is selectively connectable to the transmission housing 26. By selectively connectable is here intended that the connection between the second member 18b of the third planetary gear set 12 and the transmission housing 26 may be engaged or disengaged. Therefore a second locking mechanism C6 may be arranged in between the second member 18b of said third planetary gear set 12 and the transmission housing 26. The second locking mechanism C6 may be of any type suitable for locking and releasing second member 18b of the third planetary gear set 12 to the transmission housing 26. Preferably the second locking mechanism C6 is a friction clutch. Here, a branch connecting the second member 8b of the third planetary gear set 12 to the transmission housing 26 is generally made without any gear stages, but may include gear stages for enabling connection between the second member 18b of said third planetary gear set 12 and the transmission housing 26.

The third member 18c of the third planetary gear set 12 is selectively connectable to the first member 19a of the fourth planetary gear set 13.

Therefore a branch connecting the third member 18c of the third planetary gear set 12 with the first member 19a of the fourth planetary gear set 13 includes a second clutch C2. The second clutch may be a dog clutch.

The third member 18c of the third planetary gear set 12 is selectively connectable to a transmission output shaft 30. Therefore a branch connecting the third member 18c of the third planetary gear set 12 with the transmission output shaft 30 includes a third clutch C3. The third clutch may be a dog clutch.

The second member 19b of the fourth planetary gear set 13 is selectively connectable to the transmission housing 26. By selectively connectable is here intended that the connection between the second member 19b of the fourth planetary gear set 13 and the transmission housing 26 may be engaged or disengaged. Therefore a first locking mechanism C4 may be arranged in between the second member 19b of said fourth planetary gear set 13 and the transmission housing 26. The first locking mechanism C4 may be of any type suitable for locking and releasing second member 19b of the fourth planetary gear set 13 to the transmission housing 26. Preferably the first locking mechanism C4 is a dog clutch.

The third member 19c of the fourth planetary gear set 13 is operatively connected to the transmission output shaft 30. By operatively connected it is here intended that the connection may be made directly without gear stages or alternatively via a set of gear stages. Gear stages may be included for allowing a connection between the third member 19c of the fourth planetary gear set 13 to the transmission output shaft 30 to be made without making a gearbox topology substantially more complex.

The continuously variable transmission 1 includes a mode selection arrangement 34 which enables different operating modes with different bands of continuously variable speed ratios between the common transmission input shaft 20 and the transmission output shaft 30.

The mode selection arrangement 34 includes the second locking mechanism C6 arranged to selectively lock and release the second member 18b of said third planetary gear set 12 to the transmission housing 26, the first locking mechanisms C4 arranged to selectively lock and release the second member 19b of said fourth planetary gear set 13 to the transmission housing 26, the first clutch C1 arranged in between the common output shaft 22 and the first member 19a of the fourth planetary gear set 13, the second clutch C2 arranged between the third member 18c of the third planetary gear set 12 and the first member 19a of the fourth planetary gear set 13, the third clutch C3 arranged between third member 18c of the third planetary gear set 12 and the transmission output shaft 30, the fourth clutch C5 arranged in between the second member 18b of the third planetary gear set 12 and the third member 16c of the second planetary gear set 10, a set of actuators 36a, 36b, 36c, 36d, 36e, 36f arranged to control locking and release of said locking mechanisms C4 and C6 and arranged to control engagement and disengagement of the first to fourth clutches C1, C2, C3, C5.

The mode selection arrangement 34 includes a controller 38 arranged for operating said set of actuators 36a, 36b, 36c, 36d, 36e, 36f.

The controller 38 enables selective operation of the continuously variable transmission 1 in a first operating mode where said first and second locking mechanisms C4, C6 are locked, said second clutch C2 is engaged and said first, third and fourth clutches C1, C3, C5 are disengaged;

a second operating mode where said first locking mechanism C4 is locked, said second locking mechanism C6 is released, said second and fourth clutches C2, C5 are engaged and said first and third clutches C1, C3 are disengaged;

a third operating mode where said first locking mechanism C4 is locked, said second locking mechanism C6 is released and said first clutch C1 is engaged;

a fourth operating mode where said second locking mechanisms C6 is released and said third and fourth clutches C3, C5 are engaged;

a fifth operating mode where said first and second locking mechanisms C4, C6 are released, said first, second and third clutches C1, C2, C3 are engaged and said fourth clutch C5 is disengaged.

Optionally the controller enables selective operation of the continuously variable transmission in:

a sixth operating mode where said first locking mechanism C4 is released, said second locking mechanism C6 is locked, said third clutch C3 is engaged and said fourth clutch C5 is disengaged.

Figures 1A, 1B:
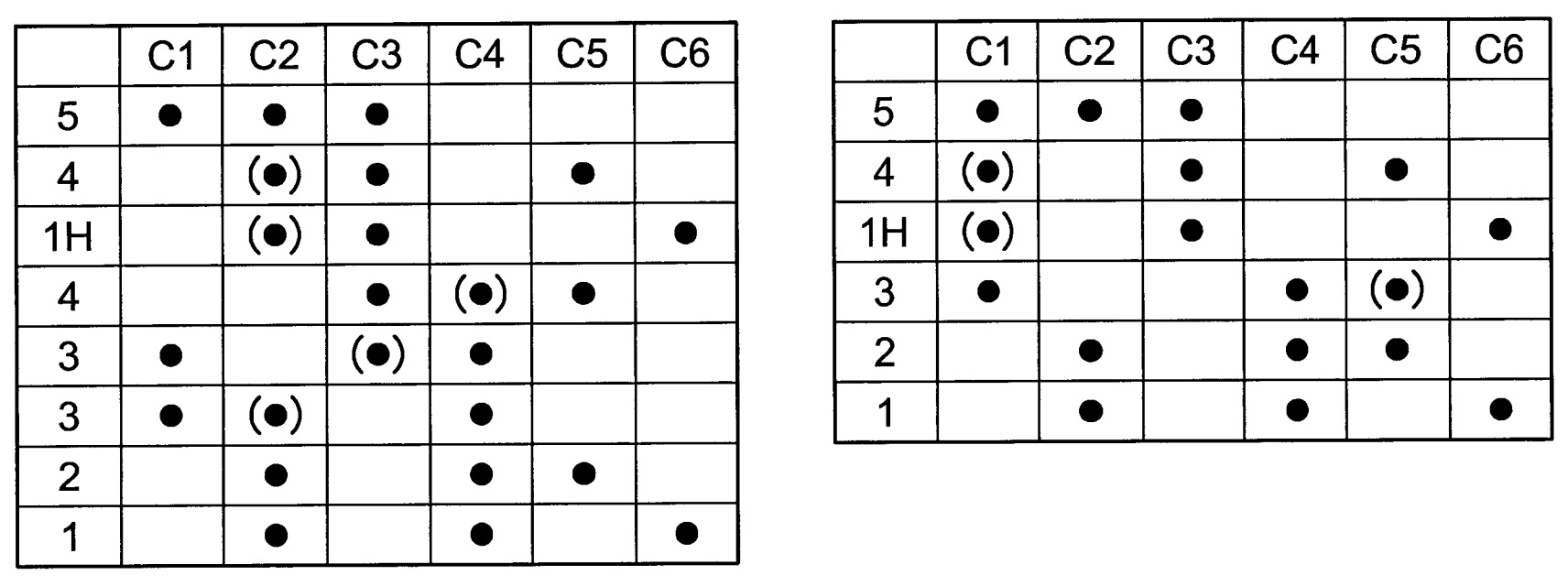

A first mode change scheme is shown in FIG. 1A. This mode change scheme is applicable in the event the second, and third clutches C2, C3 and the first locking mechanism C4 are dog clutches and the first and fourth clutches C1, C5 and the second locking mechanism C6 are friction clutches.

In the mode change scheme * denotes an engaged clutch or locking mechanism, blank denotes a disengaged clutch or released locking mechanism, and (*) denotes that the clutch or locking mechanism may be engaged to prepare for a next mode.

From FIG. 1A it can be derived that, in said third operating mode the fourth clutch C5 is disengaged and the controller 38 is arranged to disengage or leave disengaged the third clutch C3 and engage the second, clutch C2 for preparing a change from the third operating mode to the second operating mode; and in said third operating mode the fourth clutch C5 is disengaged and the controller 38 is arranged to disengage or leave disengaged said second clutch C2 and engage said third clutch C3 for preparing a change from the third operating mode to the fourth operating mode.

In the fourth operating mode the first clutch C1 is disengaged and the controller 38 is arranged to disengage or leave disengaged the second clutch C2 and lock the first locking mechanism C4 for preparing a change from the fourth operating mode to the third operating mode; and in the fourth operating mode the first clutch C1 is disengaged and the controller 38 is arranged to release or leave released the first locking mechanism C4 and engage the second clutch C2 for preparing a change from the fourth operating mode to the fifth operating mode.

Optionally the controller is arranged, to:

in the sixth operating mode selectively engage the second clutch C2 and maintain the first clutch C1 disengaged for preparing a change from the sixth operating mode to the fourth operating mode.

A second mode change scheme is shown in FIG. 1B. This mode change scheme is applicable in the event all clutches and locking mechanisms are friction clutches.

In the mode change scheme * denotes an engaged clutch or locking mechanism, blank denotes a disengaged clutch or released locking mechanism, and (*) denotes that the clutch or locking mechanism may be engaged to prepare for a next mode.

In a mode change scheme as shown in FIG. 1B, the controller 38 is arranged to:
in the sixth operating mode maintain the second clutch C2 disengaged and selectively engage the first clutch C1 for preparing a change from the sixth operating mode to the fourth operating mode.

Optionally, in the third operating mode the second and third clutches C2, C3 are disengaged and the controller 38 is arranged to engage or keep engaged the fourth clutch C5 for preparing a change from the third operating mode to the second or fourth operating modes.

Optionally, in said fourth operating mode the second clutch C2 is disengaged and the first locking mechanism C4 is released and the controller 38 is arranged to engage or keep engaged the first clutch C1 for preparing a change from the fourth operating mode to the third or fifth operating modes.

The mode selection arrangement 34 is thus provided to enable different operating modes with different bands of continuously variable speed ratios between the common transmission input shaft 20 and the transmission output shaft 30.

Figure 2:
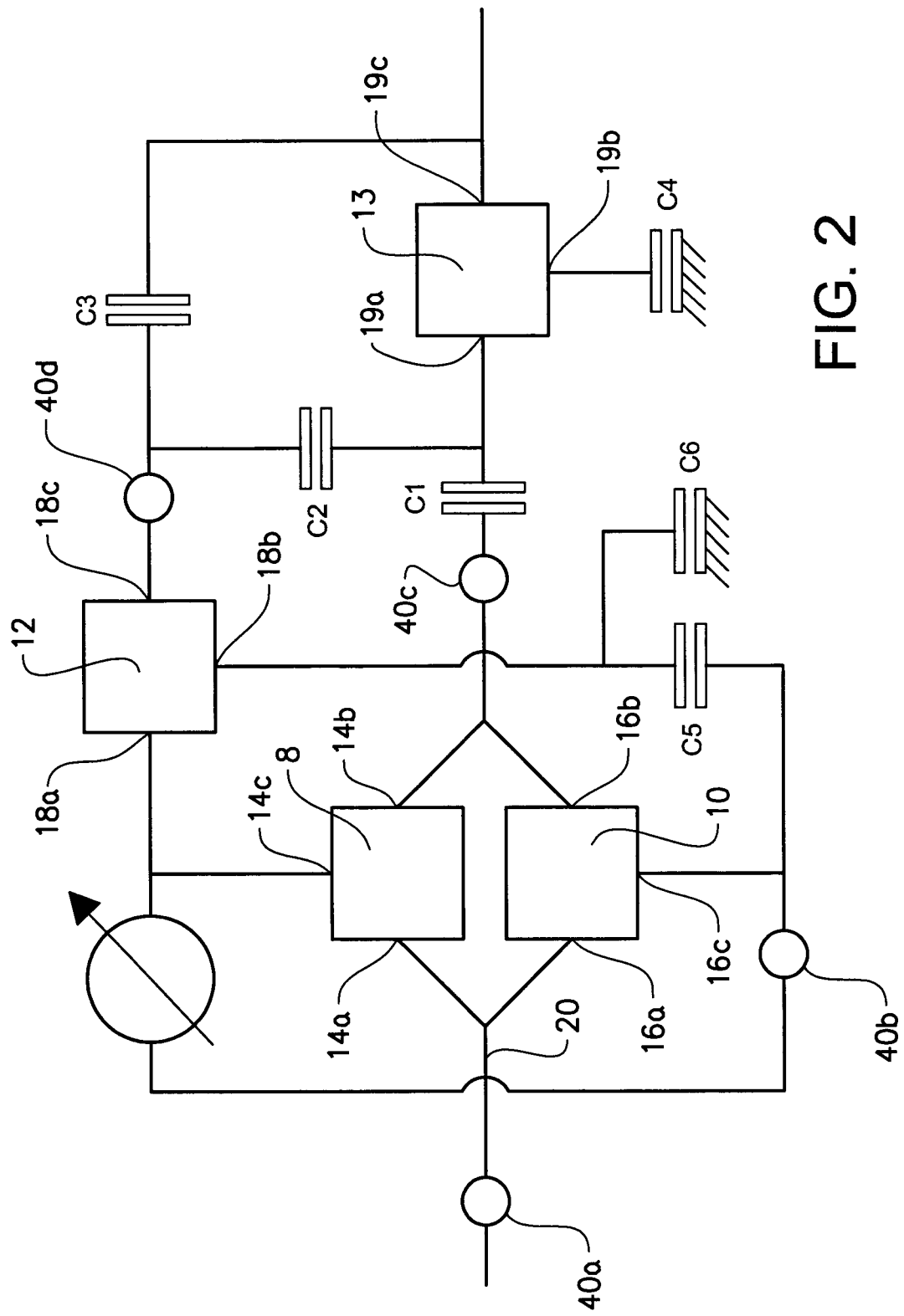
FIG. 2 shows a schematic illustration of a first specific embodiment of the continuously variable transmission according to the invention.

In FIG. 2 is shown a first specific embodiment of the invention where the first, second and third members 14a, 14b, 14c of the first planetary gear set 8 are in the mentioned order constituted by a planet carrier, a ring gear and a sun gear. Further, the first, second and third members 16a, 16b, 16c of the second planetary gear set 10 are in the mentioned order constituted by a planet carrier, a ring gear and a sun gear. The first, second and third members 8a, 18b, 18c of the third planetary gear set 12 are in the mentioned order constituted by a sun gear, a ring gear and a planet carrier. Finally the first, second and third members 19a, 19b, 19c of the fourth planetary gear set 13 are in the mentioned order constituted by a sun gear, a ring gear and a planetary carrier. The first and second planetary gears 8, 10 are preferably combined into a Ravigneaux planetary gear set.

Gear stages 40a-40d are shown in the drawing. Such gear stages are included for facilitating the topology of the continuously variable transmission. A gear stage 40a is included for connection, to the common transmission input, shall 20. A gear stage 40b is included for connecting the variator input shaft 4 to the third member 16c of the second planetary gear set 10. A gear stage 40c is included for connection of the common output shaft 22 with the first member 19a of the fourth planetary gear set 13 via the first clutch C1.

A gear stage 40d is included for connection of the third member 18c of the third planetary gear set 12 with the second and third clutches C2, C3.

Figure 3:
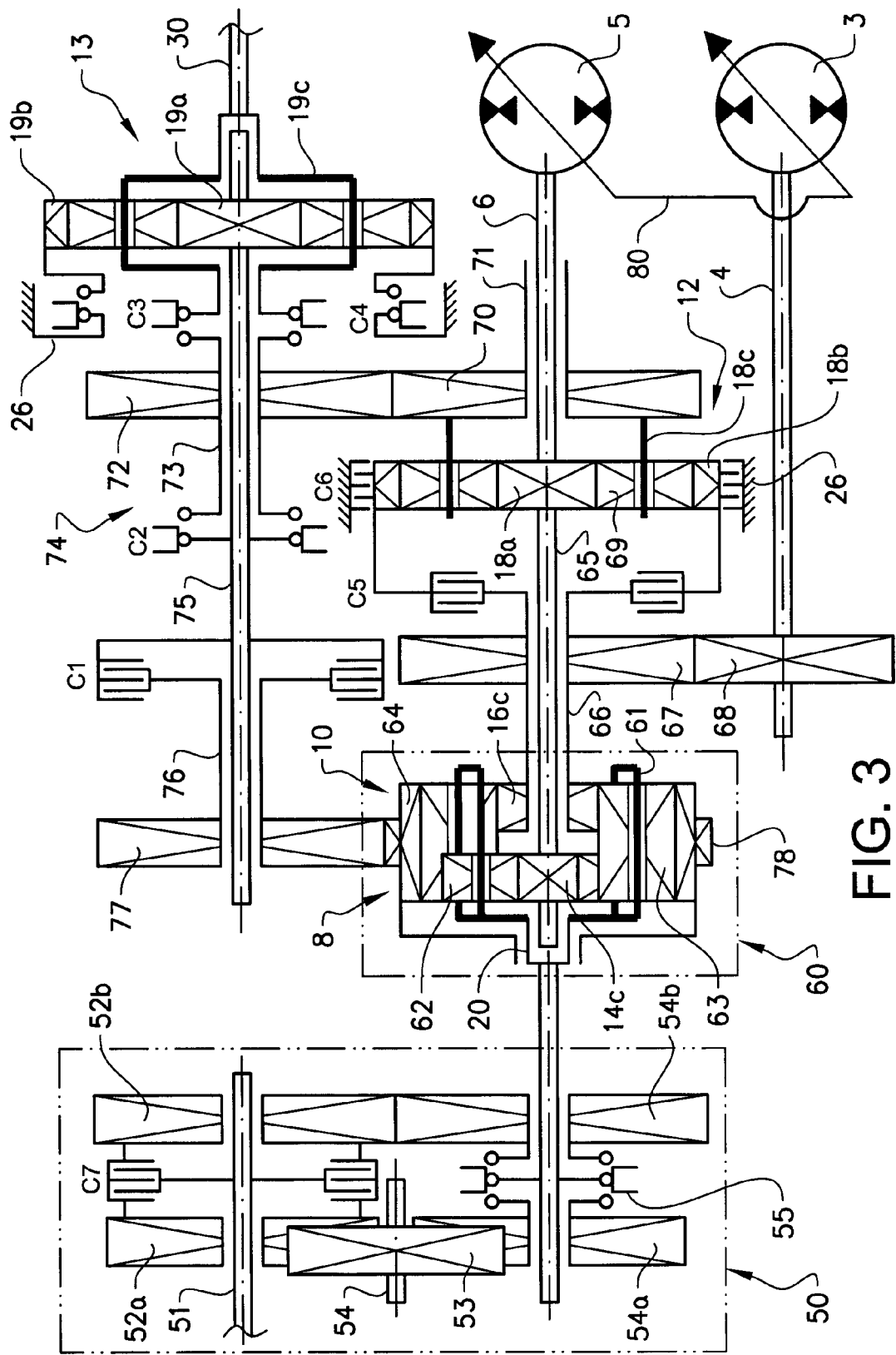
FIG. 3 shows a more detailed illustration of a variant of the specific embodiment shown in FIG. 2.

In FIG. 3 is shown a more detailed illustration of a variant of the first specific embodiment shown in FIG. 2. To the continuously variable transmission 1 is a forward-reverse gear unit 50 added to the common transmission input shaft 20. The forward-reverse gear unit 50 includes an input shaft 51 having a clutch C7 for engagement with either a first gear wheel 52a being in engagement with a third gear wheel 53 arranged on a mid shaft 54, which third gear wheel 53 is in engagement with a fourth gear wheel 54a arranged on the common transmission input shaft 20, or a second gear wheel 52b being in engagement with a fifth gear wheel 54b arranged on the common transmission input shaft 20. The fourth or the fifth gear wheels 54a, 54b are selectively connectable to the common transmission input shaft 20 by a clutch member 55. The common transmission input shaft 20 is connected to a Ravigneaux planetary gear set 60 including the first and second planetary gear sets 8, 10 and having 4 shafts. In more detail, the common transmission input shaft 20 is connected to a common planet carrier 61 of the first and second planetary gear sets 8, 10. The forward-reverse gear unit corresponds to the gear stage 40a.

The Ravigneaux planetary gear set including a large and a small sun gear 16c, 14c, and a common carrier 61 with sets of inner and of outer planet gears 62, 63 connected thereto. The set of inner planet gears 62 meshes with the small sun gear 14c and the set of outer planet gears 63 meshes with the large sun gear 16c and with the common ring gear 64. The common ring gear 64 forms the common output shaft 22 in this embodiment. The inner and outer planet gears 62, 63 are in meshing engagement with each other.

The small sun gear 14c of the first planetary gear set 8 in the Ravigneaux planetary gear set 60 is connected to a shaft 65 which is connected to or carries a sun gear 18a of a third planetary gear set 12. The first, second and third planetary gears are thus arranged in line along a common axis with the first and second planetary gear sets, in this embodiment arranged as a Ravigneaux planetary gear set and the third planetary gear set connected to the small sun gear of the Ravigneaux planetary gear set. Further, the sun gear 18a of the third planetary gear set 12 is connected to a variator output shaft 6. The variator output shaft 6 and the shaft 65 may be formed as a single shaft carrying the sun gear 18a of the third planetary gear set 12 and small sun gear 14c of the first planetary gear set 8 in the Ravigneaux planetary gear set 60. The large sun gear 16c of the second planetary gear set 10 in the Ravigneaux planetary gear set 60 is connected via a hollow shaft 66 concentrically arranged around the shaft 65 to a gear wheel 67 and the fourth clutch C5. The gear wheel 67 is in meshing engagement with a gear wheel 68 arranged on a variator input shaft 4. The gear wheels 67, 68 corresponds to the gear stage 40b.

The fourth clutch C5 is selectively connecting the hollow shaft 66 with the ring gear 18b of the third planetary gear set 12. The ring gear 18b of the third planetary gear set 12 is selectively connectable to a transmission housing 26 by the second locking mechanism C6. The ring gear 18b of the third planetary gear set 12 is in meshing engagement with planet wheels 69 arranged on a planet carrier 18c of the third planetary gear set 12. The planet carrier 18c of the third planetary gear set 12 is connected to a gear wheel 70 arranged on a hollow shaft 71 arranged on the variator output shaft 6. The gear wheel 70 is in meshing engagement with a gear wheel 72 carried on a hollow shaft 73 forming part of a clutch arrangement 74. The gear wheels 70, 72 form the gear stage 40d.

The clutch arrangement 74 includes the second and third clutches C2, C3, where the second clutch C2 may selectively connect to a shaft 75 extending through the hollow shaft 73 and being connected to a sun gear 9a of the fourth planetary gear set 13 and to a first clutch C1. The first clutch C1 is also via a hollow shaft 76 arranged on said shaft 75 connected to a gear wheel 77 being in meshing engagement with a gear wheel 78 formed on the common ring gear 64 of the Ravigneaux planetary gear set 60. The gear wheels 77, 78 form the gear stage 40c.

The third clutch C3 may selectively connect to a planet carrier 19c of the fourth planetary gear set 13 which is connected to a transmission output shaft 30. The ring gear 19b of the fourth planetary gear set 13 is connected to the first locking mechanism C4 for selectively locking to a transmission housing 26.

The variator includes two hydraulic machines 3, 5. The first hydraulic machine 3, being connected to the variator input shaft 4, is hydraulically connected to a second hydraulic machine 5 connected to the variator output shaft 6. The first and second hydraulic machines 3,5 may be controlled by a dual yoke 80.

By engagement or disengagement of the clutches C1, C2, C3, C5 respectively and by locking or releasing the locking mechanisms C4, C6, the continuously variable transmission may assume six different operating modes in a manner as explained above with reference to FIGS. 1 and 2.

Figure 4:
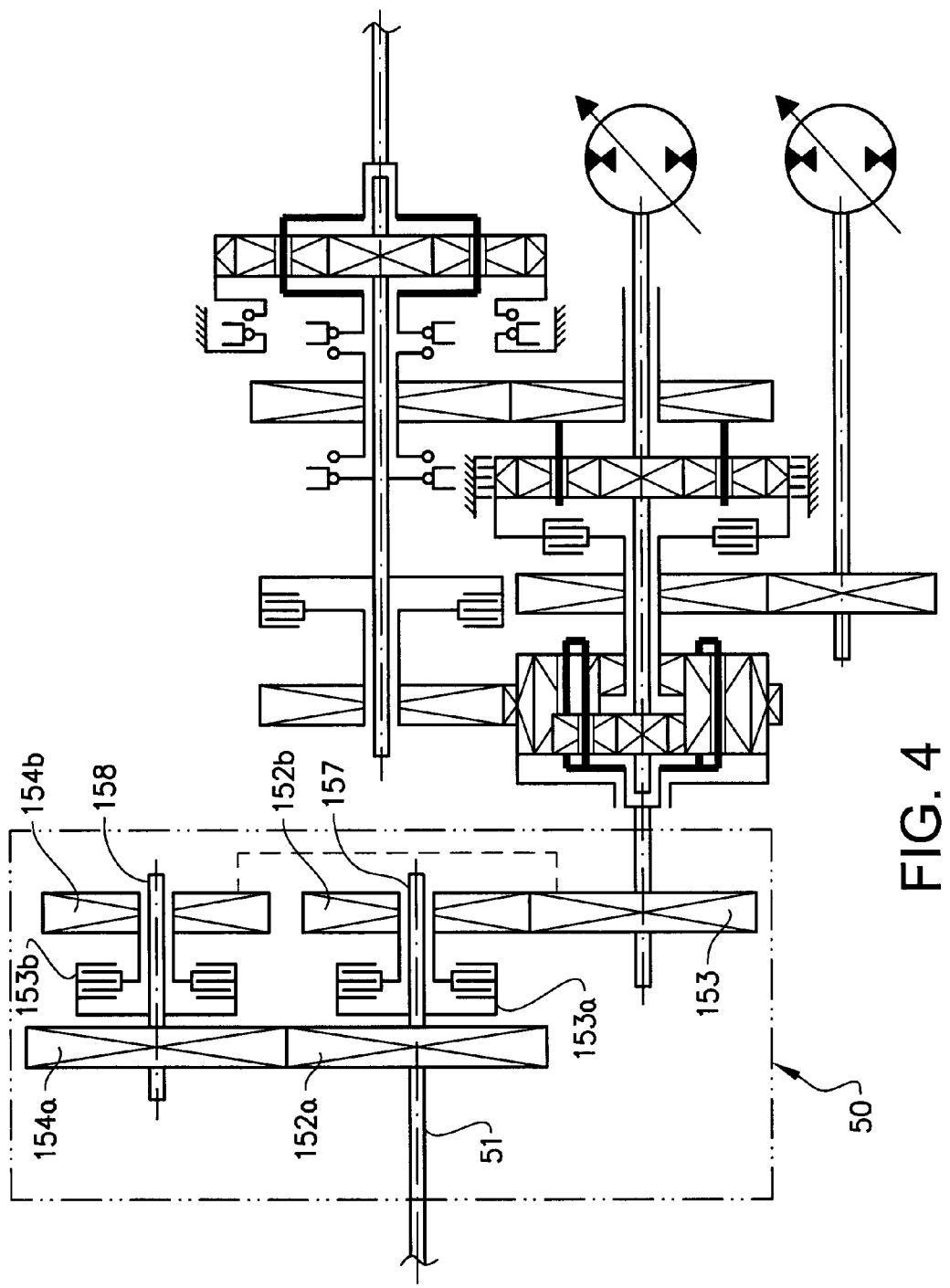
FIG. 4 shows a more detailed illustration of a variant of the specific embodiment shown in FIG. 2, with an alternative forward-reverse gear unit.

In FIG. 4 is shown an alternative embodiment of the continuously variable transmission as shown in FIG. 3. The difference is that a different forward-reverse gear unit 50 is used. The forward-reverse gear unit 50 includes an input shaft 51 which carries a first gear wheel 152*a* carried by an shaft 157 connectable by a friction clutch 153*a* to a second gear wheel 152*b* which is in meshing arrangement with a fifth gear wheel 153 arranged on the common transmission input shaft 20. The first gear wheel 152*a* is in meshing engagement with a third wheel 154*a* arranged on a reverse shaft 158. The reverse shaft 58 is selectively connectable by a friction clutch 53*b* to a fourth wheel 154*b* which is in meshing arrangement with the fifth gear wheel 153 arranged on the common transmission input shaft 20.

The forward-reverse gear unit as shown in FIG. 3 allows for small losses, while the forward-reverse gear unit as shown in FIG. 4 allows for shuttle shift.

Figure 5:
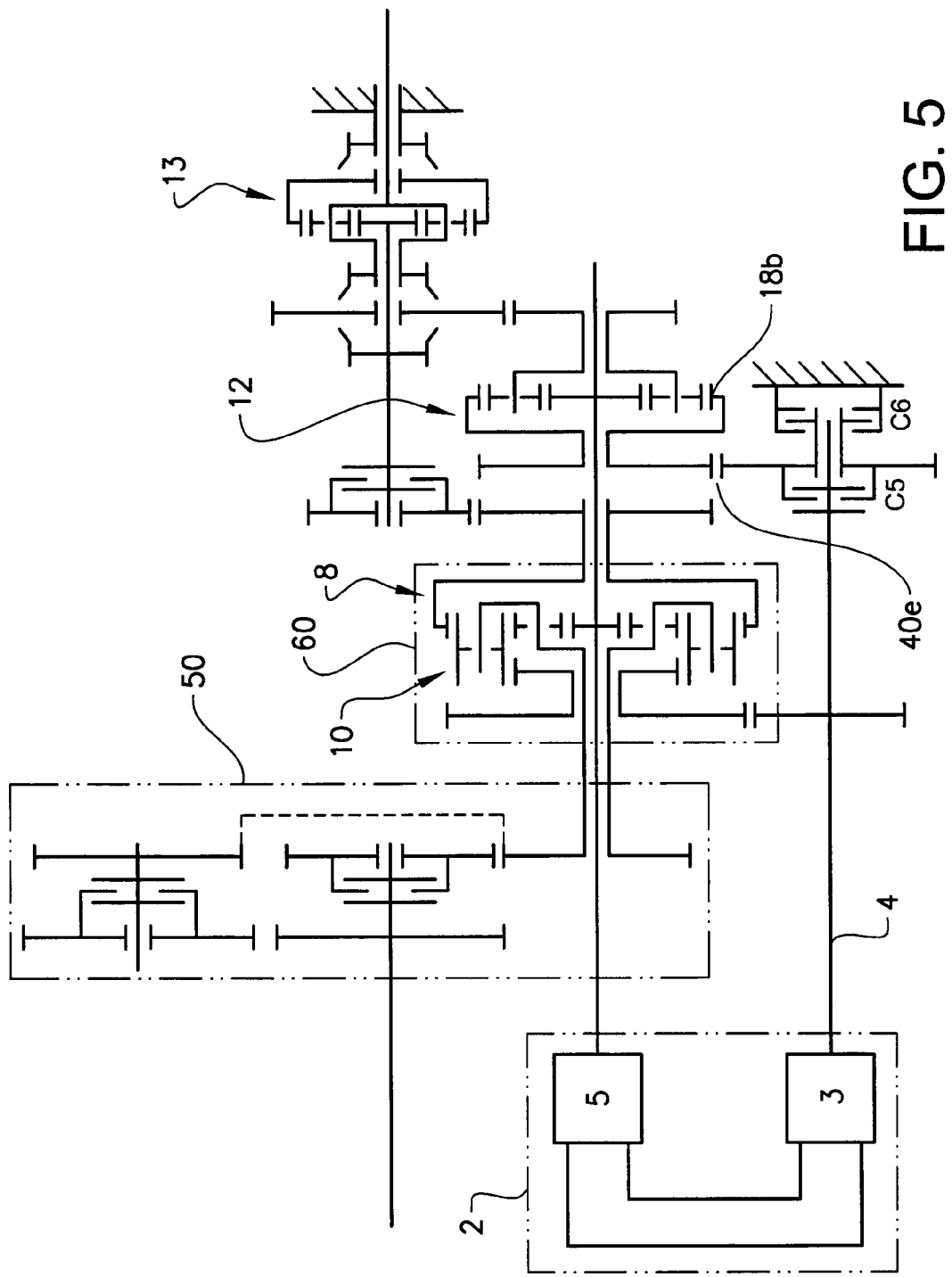
FIG. 5 shows a more detailed illustration of an alternative layout of a variant of the specific embodiment shown in FIG. 2.

In FIG. 5 yet another detailed embodiment of the continuously variable transmission according to the invention is shown. The forward-reverse unit 50 is of the type as shown in FIG. 4, with a slightly different layout. Another difference from the embodiment in FIG. 4 is that the Ravigneaux planetary gear set is mirror imaged such that the second planetary gear set 10 faces the input direction instead of the first planetary gear set 8. The variator unit 2 is also positioned on the input side instead of on the output side as in the embodiment shown in FIG. 4. However the connection between the first, second and third planetary gear sets, and the variator unit is identical to the embodiment shown in FIG. 4. A further difference is that the fourth clutch C5 and the second locking mechanism C6 are arranged on the variator input shaft 4, instead as to the third planetary gear set 12 as in the embodiment as shown in FIG. 4. In the embodiment shown in FIG. 5 a gear stage 40*e* is thus present between the ring gear 18*b* of the third planetary gear set 12 and the fourth clutch C5.

Figure 6:
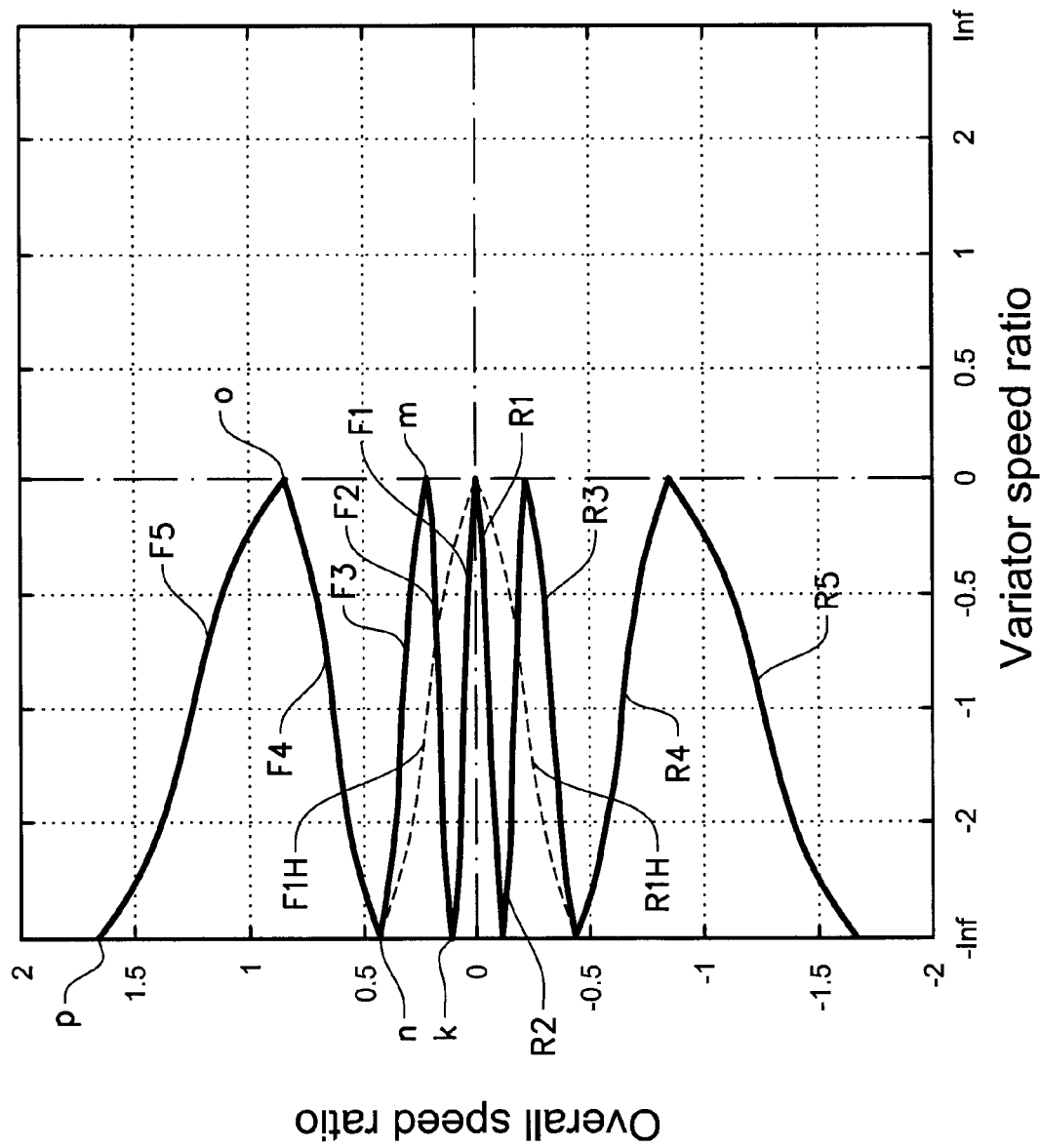
FIG. 6 shows overall speed ratio as a function of variator speed ratio for a first, second, third, fourth, fifth and sixth forward and reverse modes.

FIG. 6 shows overall speed ratio itotal as a function of variator speed ratio ivariator for a first, second, third, fourth, fifth and sixth forward and reverse modes. The mode changes appear at variator speed ratio of 0 or negative infinity. The respective modes are marked F1, F1H, F2, F3, F4, F5; and R1, R1H, R2, R3, R4, R5 respectively.

A first band of the first operating mode F1 extends from a total, speed, ratio itotal over the continuously variable transmission, which is equal to zero tor a variator speed ratio of zero, to a ratio itotal=k for a variator speed ratio of negative infinity. A second band of a second operating mode F2 preferably extends from ratio itotal=k for a variator speed ratio of a negative infinity, to a ratio itotal=m for a variator speed ratio of zero. A third band of a third operating mode F3 preferably extends from ratio itotal=m for a variator speed ratio of zero to a ratio itotal=n for a variator speed ratio of negative infinity. A fourth band of a fourth operating mode F4 preferably extends from ratio itotal=n for a variator speed ratio of negative infinity, to a ratio itotal=o for a variator speed ratio of zero. A fifth band of a fifth operating mode F5 preferably extends from ratio itotal=o for a variator speed ratio of zero to a ratio itotal=P for a variator speed ratio of negative infinity. A sixth band of the sixth operating mode F1H extends from a total speed ratio itotal over the continuously variable transmission, which is equal to zero for a variator speed ratio of zero, to a ratio itotal=n for a variator speed ratio of negative infinity. The same principle applies for the reverse modes R1, R1H, R2, R3, R4, R5 respectively.

Figure 7:
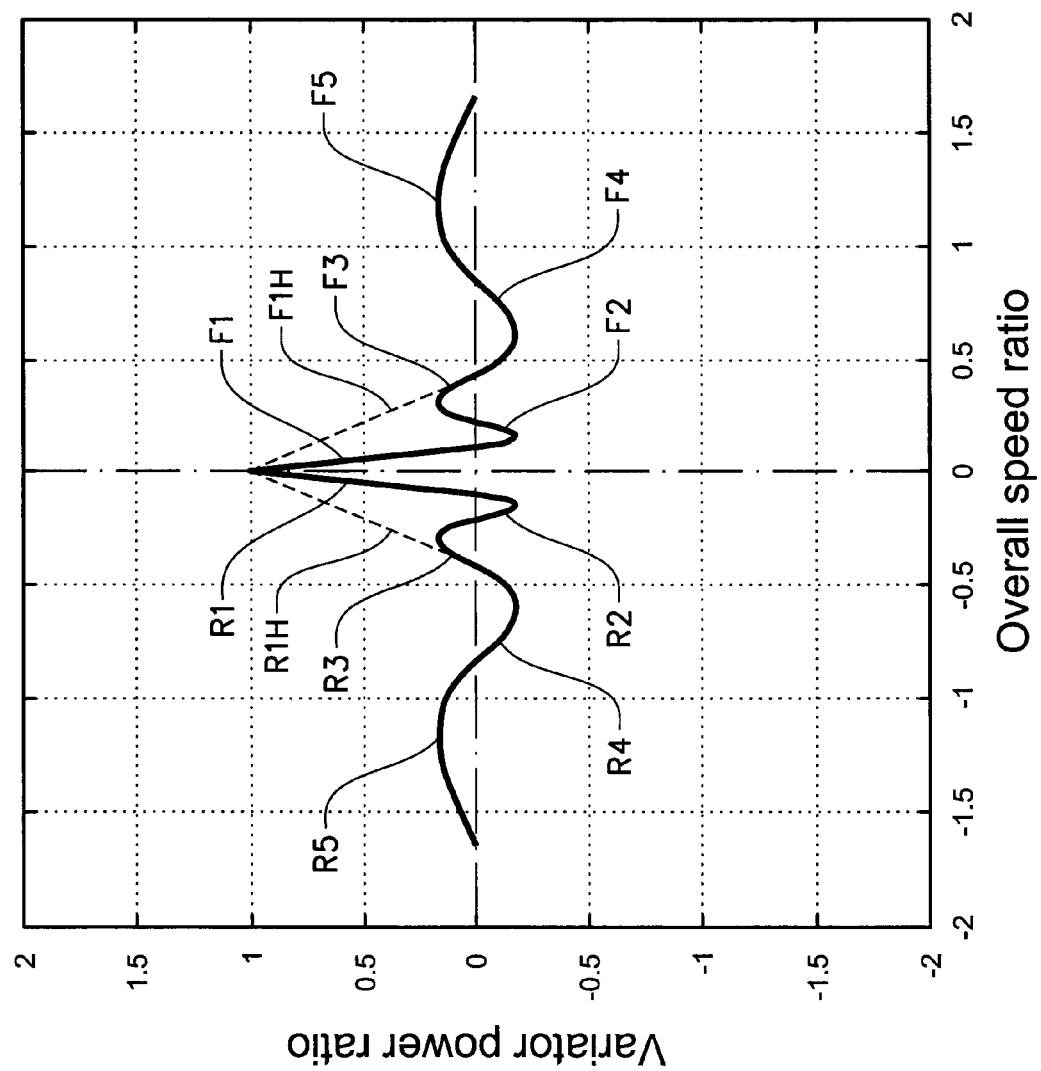
FIG. 7 shows a variator power ratio as a function of overall speed ratio for a first, second, third, fourth, fifth and sixth forward and reverse modes.

FIG. 7 shows the variator power ratio Pvariator/Ptotal as a function of overall speed ratio itotal for a first, second, third, fourth, fifth and sixth forward and reverse mode. The mode changes appear at variator power ratio of 0. The respective modes are marked F1, F1H, F2, F3, F4, F5; and R1, R1H, R2, R3, R4, R5 respectively.

Figure 8:
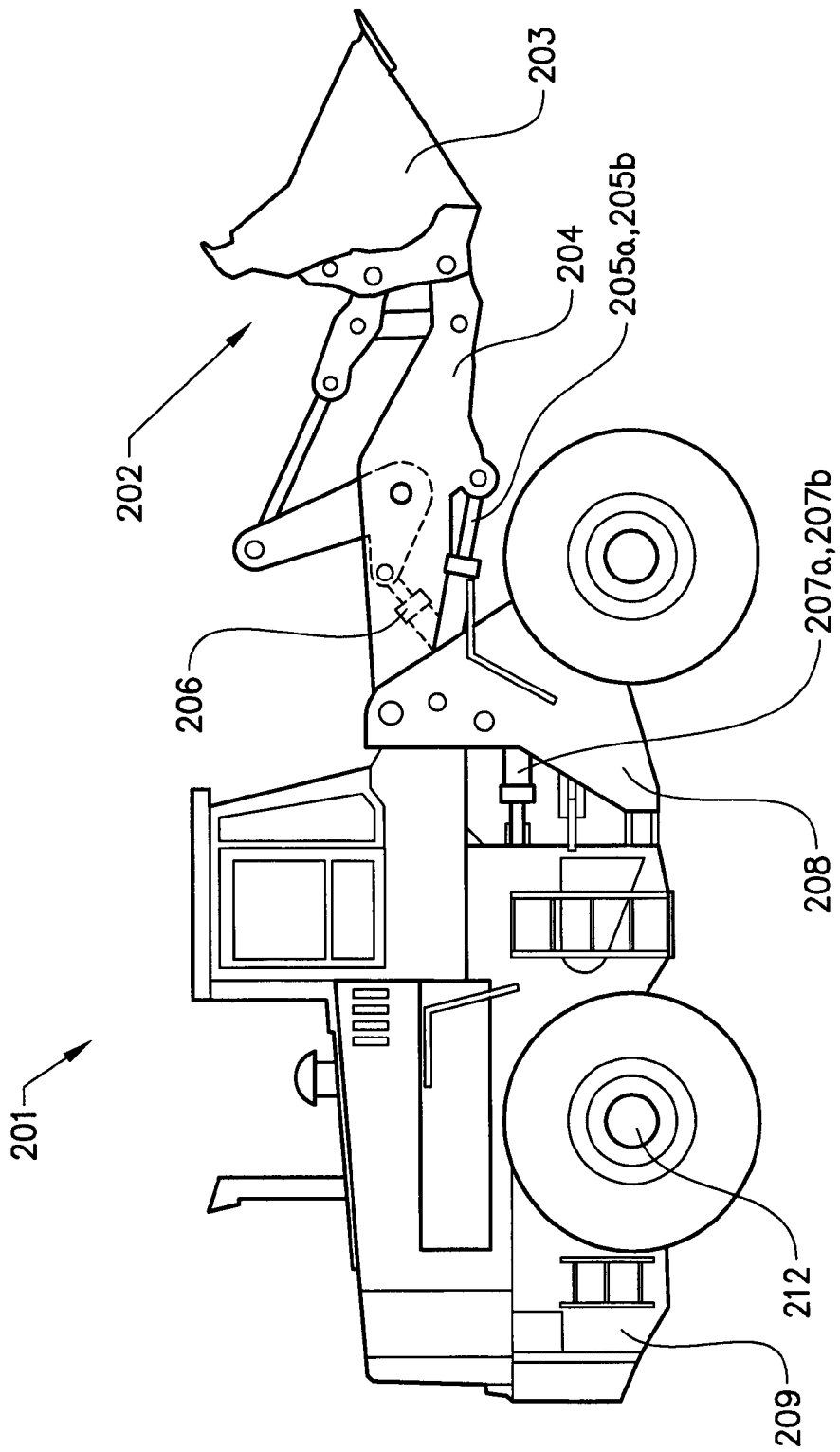
FIG. 8 is a lateral view illustrating a wheel loader having a bucket for loading operations, and a hydraulic system for operating the bucket and steering the wheel loader.

FIG. 8 is an illustration of a working machine 201 in the form of a wheel loader having an implement 202. The term "implement" is intended to comprise any kind of tool using hydraulics, such as a bucket, a fork or a gripping tool arranged on a wheel loader, or a container arranged on an articulated hauler. The implement illustrated comprises a bucket 203 which is arranged on an arm unit 204 for lifting and lowering the bucket 203, and further the bucket 203 can be tilted or pivoted relative to the arm unit 204. The wheel loader 201 is provided with a hydraulic system comprising at least one hydraulic machine (not shown in FIG. 8). The hydraulic machine can be a hydraulic pump, although it is preferred that the hydraulic machine can work as a hydraulic pump as well as a hydraulic motor with a reversed flow of hydraulic fluid. Such a hydraulic machine with said both functions can be used as a pump for providing the hydraulic system with hydraulic fluid, for example to lift and tilt the bucket, and as a hydraulic motor for recuperation of energy, for example during a lowering operation of the implement 202. In the example embodiment illustrated in FIG. 8 the hydraulic system comprises two hydraulic cylinders 205*a*, 205*b* for the operation of the arm unit 204 and a hydraulic cylinder 206 for tilting the bucket 203 relative to the arm unit 204. Furthermore the hydraulic system comprises two hydraulic cylinders 207*a*, 207*b* arranged on opposite sides of the wheel loader for turning the wheel loader by means of relative movement of a front body part 208 and a rear body part 209. In other words; the working machine is frame-steered by means of the steering cylinders 207*a*, 207*b*.

Figure 9:
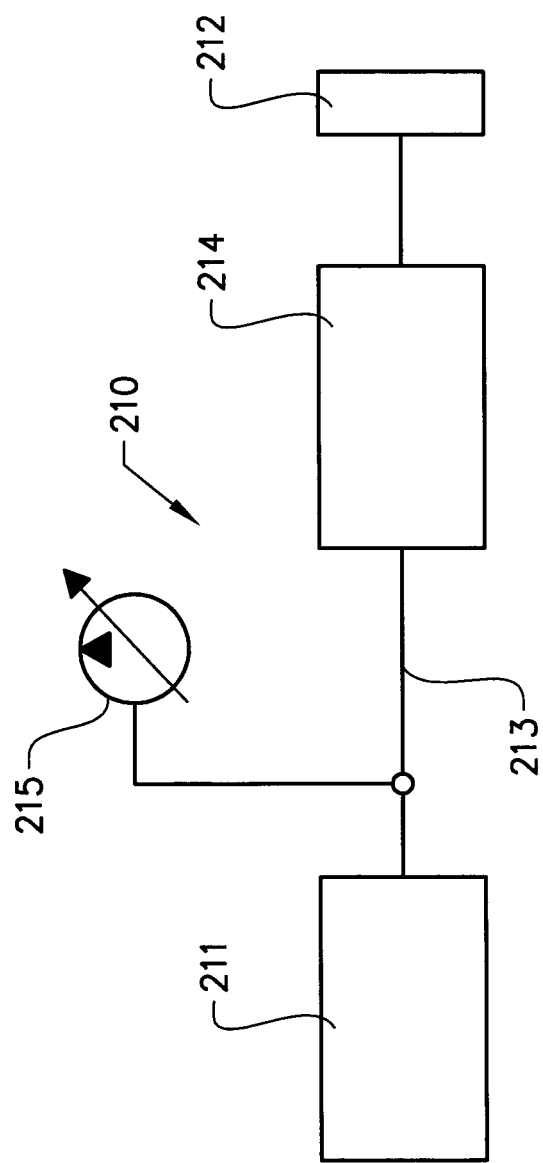
FIG. 9 is a schematic illustration of a drive train of the working machine illustrated in FIG. 8.

FIG. 9 is a schematic illustration of a drive train 210 of the working machine 201 illustrated in FIG. 8. The drive train 210 comprises a prime mover 211 for supplying power to the driving wheels 212 of the working machine, and a transmission line 213 arranged between the prime mover 211 and the driving wheels 22 for transmitting power from the prime mover 211 to the driving wheels 212. The driving wheels 212 are schematically illustrated in FIG. 9. However, any number of wheels and wheel axles can be used in the working machine according to the invention. For example, there can be one front axle and one rear axle as illustrated in FIG. 8 and some or all of the wheels can be driven wheels. Although the prime mover 211 is preferably an internal combustion engine (ICE), for example a diesel engine, other prime movers such as for example Sterling engines can also be used. The transmission line 213 comprises a transmission 214 including a continuously variable transmission 1 according to the invention, and the forward-reverse gear unit 50. The transmission 214 is arranged between the prime mover 211 and the driving wheels 212.

In FIG. 9 said at least one hydraulic machine 215 for moving the implement 202 arranged on the working machine 201 and/or for steering the working machine 201 is schematically illustrated. The working machine can be equipped with one or more hydraulic machines for providing the hydraulic fluid required.

Figure 10:
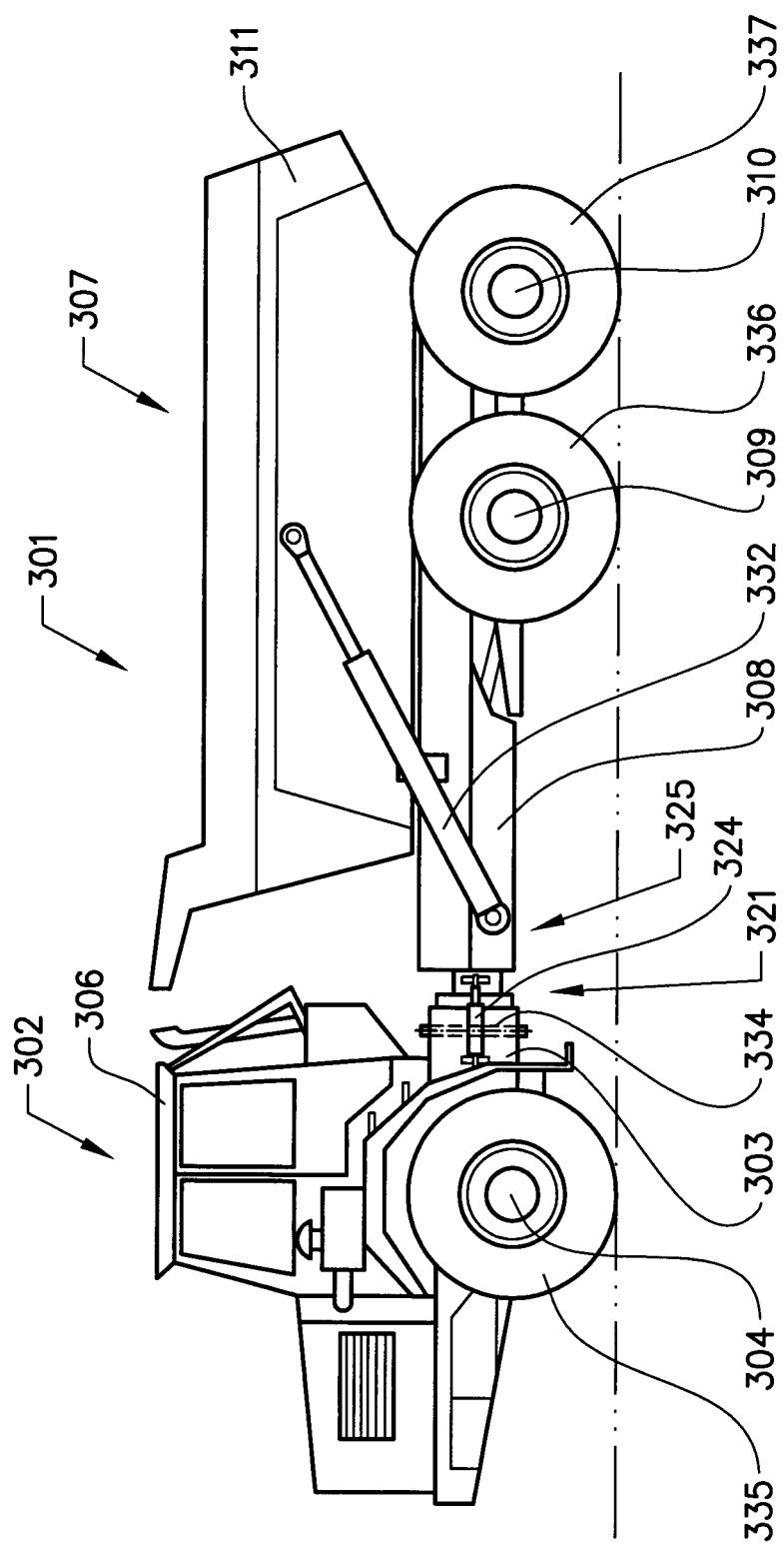
FIG. 10 is aside view of an articulated hauler.

The invention is particularly suitable for use on an articulated hauler as shown in FIG. 10, since an articulated hauler may require a rather large span in working speed due to operating in construction sites as well as on roads.

In FIG. 10 is shown an articulated hauler or frame steered dumper 301 in a side view. The articulated hauler 301 comprises a front vehicle section 302 comprising a front frame 303, a from wheel axle 304 and a cab 306 for a driver. The articulated hauler 301 also comprises a rear vehicle section 307 comprising a rear frame 308, a front wheel axle 309, a rear wheel axle 310 and a tiltable container 311.

The front and rear wheel axles 309, 310 of the rear vehicle section 307 are connected to the rear frame 308 via a bogie arrangement. Each of the axles comprise a left ground engagement element 335,336,337 and a right ground engagement element (not shown), which may be in the form of wheels.

A first pivot joint 325 is adapted in order to allow the front frame 303 and the rear frame 308 to be pivoted relative to one another about an imaginary longitudinal axis, that is to say an axis which extends in the longitudinal direction of vehicle 301.

The front frame 303 is connected to the rear frame 308 via a second joint 321 which allows the front frame 303 and the rear frame 308 to be pivoted relative to one another about a vertical axis 334 for steering (turning) the vehicle. Actuators in the form of hydraulic cylinders 324 are arranged on respective sides of the rotary joint 321 for steering the vehicle. The hydraulic cylinders are controlled by the driver of the vehicle via a steering wheel and/or joystick (not shown).

The container 311 is connected to the rear frame 308 via an articulation (not shown) at a rear portion of the rear frame 308. A pair of tilting cylinders 332 are connected to the rear frame 308 with a first end and connected to the container 311 with a second end. The tilting cylinders 332 are positioned on each side of a central axis of the vehicle in its longitudinal direction. The container is therefore tilted in relation to the rear frame 308 on activation of the tilting cylinders.

The invention claimed is:

1. A continuously variable transmission including a variator unit having a variator input shaft and a variator output shaft, and a first, a second, a third and a fourth planetary gear set, wherein each of the first and second planetary gear sets has a first member being operatively connected to a common transmission input shaft which common transmission input shaft is common to the first and second planetary gear sets and a second member being operatively connected to an output shaft which output shaft is common to the first and second planetary gear sets, each of the first and second planetary gear sets further including a third member, and the third planetary gear set having a first, a second and a third member, wherein the variator input shaft is operatively connected to the third member of the second planetary gear set and that the variator output shaft is operatively connected to the third member of the first planetary gear set, that the first member of the third planetary gear set is operatively connected to the variator output shaft, that the second member of the third planetary gear set is selectively connectable to the third member of the second planetary gear set and selectively connectable to a transmission housing, that the third member of the third planetary gear set is selectively connectable to a transmission output shaft and that a first member of the fourth planetary gear set being selectively connectable to the output shaft and selectively connectable to the third member of the third planetary gear set, a second member of the fourth planetary gear set being selectively connectable to the transmission housing and a third member of the fourth planetary gear set being operatively connected to the transmission output shaft.

2. A continuously variable transmission according to claim 1, wherein the first, second and third members of the fourth planetary gear set are in order, a sun gear, a ring gear and a planet carrier.

3. A continuously variable transmission according to claim 1, wherein the first, second and third members of the third planetary gear set are, in order, a sun gear, a ring gear and a planet carrier.

4. A continuously variable transmission according to claim 1, wherein the first, second and third members of the first planetary gear set are, in order, a ring gear, a planet carrier and a sun gear, and that the first, second and third members of the second planetary gear set are, in order, a planet carrier, a ring gear and a sun gear.

5. A continuously variable transmission according to claim 1, wherein the first members of the first and second planetary gear sets are constituted by a planet carrier which planet carrier is common to the first and second planetary gear sets and that the second members of the first and second planetary gear sets are constituted by a ring gear which ring gear is common to the first and second planetary, gear sets and that the third members of the first and second planetary gear sets are constituted by a first sun gear and a second sun gear, respectively.

6. A continuously variable transmission according to claim 1, wherein the first members of the first and second planetary gear sets are constituted by a ring gear which ring gear is common to the first and second planetary gear sets and that the second members of the first and second planetary gear sets are constituted by a planet carrier which planet carrier is common to the first and second planetary gear sets and that the third members of the first and second planetary gear sets are constituted by a first sun gear and a second sun gear, respectively.

7. A continuously variable transmission according to claim 1, wherein a mode selection arrangement is provided which enables selection of different operating modes with different bands of continuously variable speed ratios between the common transmission input shaft and the transmission output shaft.

8. A continuously variable transmission according to claim 7, wherein the mode selection arrangement includes:
a first clutch arranged in between the output shaft and the first member of the fourth planetary gear set;
a second clutch arranged in between the first member of the fourth planetary gear set and the third member of the third planetary gear set;
a third clutch arranged in between the third member of the third planetary gear set and the transmission output shaft;
a fourth clutch arranged in between the second member of the third planetary gear set and the third member of the second planetary gear set;
a first locking mechanism arranged to selectively lock the second member of the fourth planetary gear set to the transmission housing and release the second member of the fourth planetary gear set from the transmission housing;
a second locking mechanism arranged to selectively lock the second member of the third planetary gear set to the transmission housing and release the second member of the third planetary gear set from the transmission housing; and
a set of actuators arranged to control engagement and disengagement of the clutches and arranged to control locking of the locking mechanisms to the transmission housing and release of the locking mechanisms from the transmission housing, respectively.

9. A continuously variable transmission according to claim 8, wherein the mode selection arrangement includes a controller arranged for operating, the set of actuators.

10. A continuously variable transmission according to claim 9, wherein the controller enables selective operation of the continuously variable transmission in:
   a first operating mode where the first and second locking mechanisms are locked, the second clutch is engaged and the first, third and fourth clutches are disengaged;
   a second operating mode where the first locking mechanism is locked, the second locking mechanism is released, the second and fourth clutches are engaged and the first and third clutches are disengaged;
   a third operating mode where the first locking mechanism is locked, the second locking mechanism is released and the first clutch is engaged;
   a fourth operating, mode where the second locking mechanism is released and the third and fourth clutches are engaged;
   a fifth operating, mode where the first and second locking mechanisms are released, the first, second and third clutches are engaged and the fourth clutch is disengaged.

11. A continuously variable transmission according to claim 10, wherein the controller enables selective operation of the continuously variable transmission in:
   a sixth operating mode where the first locking mechanism is released, the second locking mechanism is locked, the third clutch is engaged and the fourth clutch is disengaged.

12. A continuously variable transmission according to claim 11, wherein the first clutch is disengaged and the controller is arranged, to:
   in the sixth operating mode selectively engage the second clutch for preparing a change from the sixth operating mode to the fourth operating mode.

13. A continuously variable transmission according to claim 10, wherein
   in the third operating mode the fourth clutch is disengaged and in that the controller is arranged to disengage or leave disengaged the third clutch and engage the second clutch for preparing a change from the third operating mode to the second operating mode; and
   in the third operating mode the fourth clutch is disengaged and in that the controller is arranged to disengage or leave disengaged the second clutch and engage the third clutch for preparing a change from the third operating mode to the fourth operating mode.

14. A continuously variable transmission according to claim 10, wherein
   in the fourth operating mode the first clutch is disengaged and the controller is arranged to disengage or leave disengaged the second clutch and lock the first locking mechanism for preparing a change from the fourth operating mode to the third operating mode, and
   in the fourth operating mode the first clutch is disengaged and the controller is arranged to release or leave released the first locking mechanism and engage the second clutch for preparing a change from the fourth operating mode to the fifth operating mode.

15. A continuously variable transmission according to claim 8, wherein the second and third clutches and the first locking mechanism are dog-clutches, and that the first and fourth clutches and the second locking mechanism are friction clutches.

16. A continuously variable transmission according to claim 15, wherein the controller is arranged to selectively engage or disengage a dog clutch in an unloaded state before changing operating mode by engaging a friction clutch and disengaging another friction clutch.

17. A continuously variable transmission according, to claim 11, wherein the second clutch is disengaged and the controller is arranged to:
   in the sixth operating mode selectively engage the first clutch for preparing a change from the sixth operating mode to the fourth operating mode.

18. A continuously variable transmission according to claim 10 wherein
   in the third operating mode the second and third clutches are disengaged and in that the controller is arranged to engage or keep engaged the fourth clutch for preparing a change from the third operating mode to the second or fourth operating modes.

19. A continuously variable transmission according to claim 10 wherein
   in the fourth operating mode the second clutch is disengaged and the first locking mechanism is released and in that the controller is arranged to engage or keep engaged the first clutch for preparing a change from the fourth operating mode to the third or fifth operating modes.

20. A continuously variable transmission according to claim 1, wherein the first, second and third planetary gear sets are arranged in line along a common axis.

* * * * *